United States Patent [19]

Ikebe et al.

[11] Patent Number: 5,537,280
[45] Date of Patent: Jul. 16, 1996

[54] TAPE CASSETTE

[75] Inventors: Masaru Ikebe; Takateru Satoh, both of Saku, Japan

[73] Assignee: TDK Corporation, Tokyo, Japan

[21] Appl. No.: 382,670

[22] Filed: Feb. 2, 1995

[30] Foreign Application Priority Data

Feb. 4, 1994 [JP] Japan .................... 6-032070

[51] Int. Cl.⁶ .............................................. G11B 23/087
[52] U.S. Cl. .................................................. 360/132
[58] Field of Search ...................... 360/132; 242/347.1

[56] References Cited

U.S. PATENT DOCUMENTS

| | | | |
|---|---|---|---|
| 4,626,948 | 12/1986 | Tanaka et al. | 360/132 |
| 4,685,016 | 8/1987 | Baranski | 360/132 |
| 4,893,766 | 1/1990 | Yamashina et al. | 242/347.1 |
| 5,065,955 | 11/1991 | Fujii | 360/132 X |
| 5,308,014 | 5/1994 | Honsho et al. | 242/347.1 |
| 5,404,261 | 4/1995 | Ohira et al. | 242/347.1 |
| 5,422,773 | 6/1995 | Ozaki et al. | 360/132 |
| 5,453,896 | 9/1995 | Ohira | 360/132 |

FOREIGN PATENT DOCUMENTS

| | | |
|---|---|---|
| 125688 | 11/1984 | European Pat. Off. . |
| 573058 | 12/1993 | European Pat. Off. . |
| 63-18271 | 4/1988 | Japan . |
| 4337583 | 11/1992 | Japan . |
| 5290540 | 11/1993 | Japan . |
| 5334841 | 12/1993 | Japan . |
| 5342803 | 12/1993 | Japan . |
| 5342804 | 12/1993 | Japan . |
| 5342805 | 12/1993 | Japan . |
| 5342801 | 12/1993 | Japan . |
| 2187711 | 3/1987 | United Kingdom . |

*Primary Examiner*—John H. Wolff
*Attorney, Agent, or Firm*—Price, Gess & Ubell

[57] ABSTRACT

A tape cassette capable of being readily assembled irrespective of a lid for covering a tape being constituted by three lid member and effectively preventing disengagement of a support shaft of the lid from a bearing hold due to application of shock to the tape cassette. A lid including a front lid member for covering a front surface of a tape, an upper lid member for covering its upper surface and a rear lid member for covering its rear surface is arranged so as to be openable with respect to a casing, to thereby selectively expose the tape, wherein a connection between each two of the lid members is constituted by a diameter enlarged section of a support shaft of one of the lid members provided with a cutout and a shaft bearing hole of the other lid member formed with an opening smaller than the diameter enlarged section and substantially equal to or smaller than the cutout.

37 Claims, 6 Drawing Sheets

F I G. 11
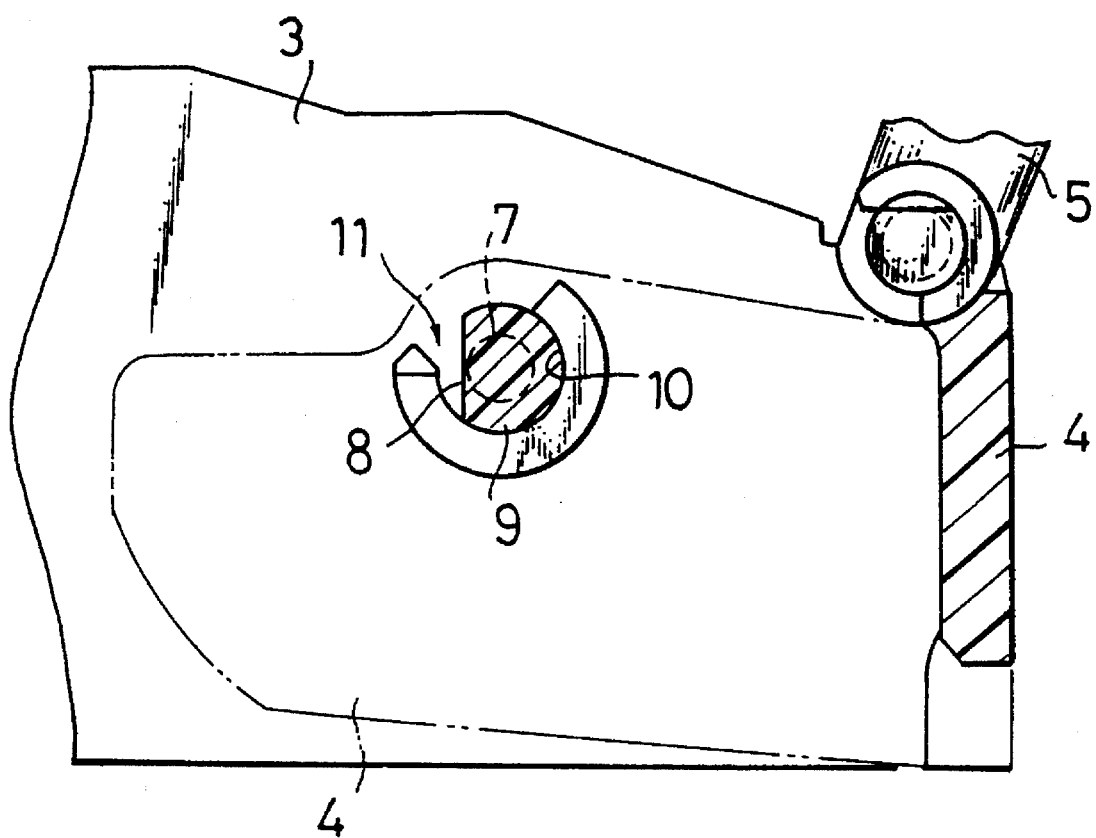

TAPE CASSETTE

BACKGROUND OF THE INVENTION

This invention relates to a tape cassette, and more particularly to a tape cassette such as a video cassette, an 8 mm video cassette, a DAT cassette or the like which is adapted to receive a tape such as a tape-like recording medium or the like therein.

A tape cassette which has been conventionally known in the art typically includes a lid which is constructed in such a manner that a front lid member and a rear lid member are arranged so as to surroundingly cover a portion of a tape positioned on or traveling along a front portion of the cassette during storage or transportation or in use, to thereby prevent adhesion of dust or the like to the tape, pollution of the tape by fingers and damage to the tape.

In the conventional tape cassette thus constructed, the front lid member for covering a front surface of the tape is significantly large-sized, therefore, it is required to increase a space required for pivotal movement of the lid which is provided in a lid receiving section of a recording and reproducing unit. In view of this respect, a lid is proposed wherein a front lid member is divided into two pieces. More particularly, the lid proposed includes a front lid member for covering a front surface of a tape, an upper lid member for covering an upper portion of the tape and a rear lid member for covering a rear surface of the tape, which are actuated in association with each other.

Unfortunately, the proposed lid constituted by the three lid members renders a combination of support shaft and guide pins of each of the lid members with shaft bearing holes and guide grooves associated with the shafts and guide pins for assembling and operation of the lid highly troublesome and causes the combination to be readily disassembled when shock such as drop impact or the like is applied thereto.

SUMMARY OF THE INVENTION

The present invention has been made in view of the foregoing disadvantage of the prior art.

Accordingly, it is an object of the present invention to provide a tape cassette which includes a lid capable of being readily assembled of three lid members while ensuring firm connection between the lid members.

It is another object of the present invention to provide a tape cassette which is capable of effectively preventing disassembling of a lid irrespective of application of any shock thereto.

It is a further object of the present invention to provide a tape cassette which is capable of ensuring smooth and safe operation of a lid.

In accordance with the present invention, a tape cassette is provided. The tape cassette includes a casing, a pair of reel hubs rotatably arranged ill the casing and having a tape wound thereon in a manner to be stretched therebetween while extending from one of the reel hubs through a front portion of the casing to the other of the reel hubs, and a lid including a front lid member for covering a front surface of the tape, an upper lid member for covering an upper end of the tape and a rear lid member for covering a rear surface of the tape. The lid is arranged on the casing so as to selectively expose the tape when the tape cassette is charged in a recording and reproducing equipment. Each of the front lid member, upper lid member and rear lid member is connected to at least two of the casing and the remaining lid members through connections so that the front, upper and rear lid members are operatively associated with each other when the lid is operated. At least one of the connections is constituted by at least one support shaft provided on one of the lid members and casing and at least one bearing section provided on another one of the lid members and casing so as to pivotally support the support shaft. The support shaft is provided with a diameter enlarged section formed on a part of an outer periphery thereof with a cutout. The bearing section is formed with a bearing hole in which the diameter enlarged section of the support shaft is rotatably fitted and which is formed with an opening through which the support shaft is inserted into the bearing hole. The opening of the bearing hole is formed in a manner to be parallel to an axis of the bearing hole and with a size smaller than a diameter of the diameter enlarged section and equal to or larger than a diameter of the part of the diameter enlarged section at which the cutout is formed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIGS. 5(a) and 5(b) each are a vertical sectional view of the tape cassette of FIGS. 1(a) to 1(c) showing a manner of operation of the tape cassette, wherein FIG. 5(a) shows the tape cassette of which a lid is closed and FIG. 5(b) shows that of which the lid is kept open;

FIGS. 6(a) and 6(b) each are a sectional view showing a lid incorporated in the tape cassette of FIGS. 1(a) to 1(c), wherein FIG. 6(a) shows the lid prior to assembling and FIG. 6(b) shows that after assembling;

FIG. 11 is an enlarged schematic side elevation view in section showing an essential part of a further embodiment of a tape cassette according to the present invention.

DETAILED DESCRIPTION OF THE PREFERRED EMBODIMENTS

Figure 1A:
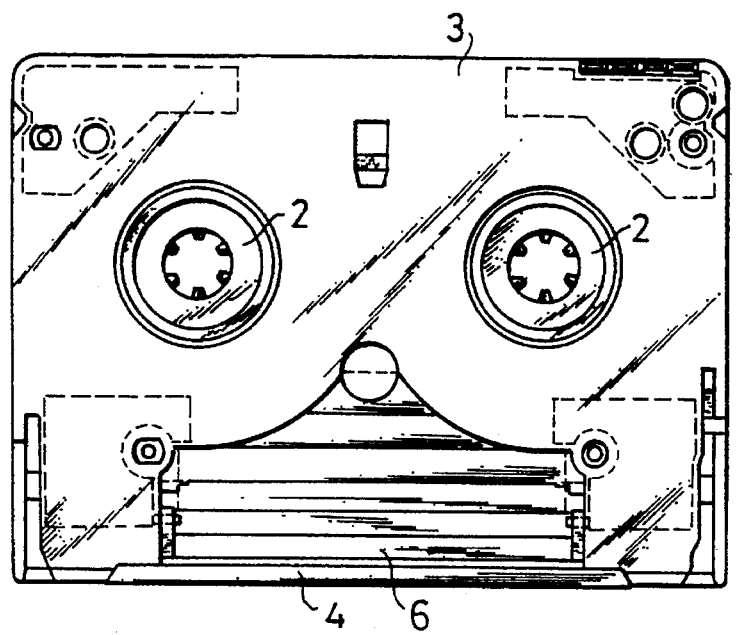
FIG. 1(a) is a bottom view showing an embodiment of a tape cassette according to the present invention.
Figure 1B:
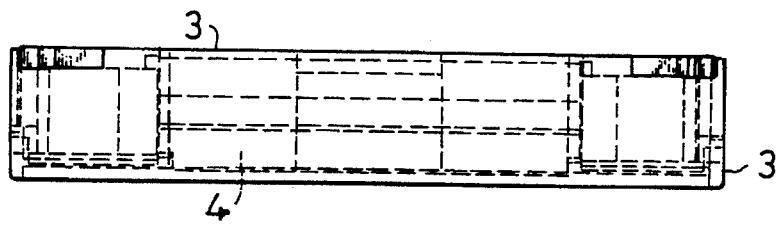
FIG. 1(b) is a front elevation view of the tape cassette shown in FIG. 1(a)
Figure 1C:
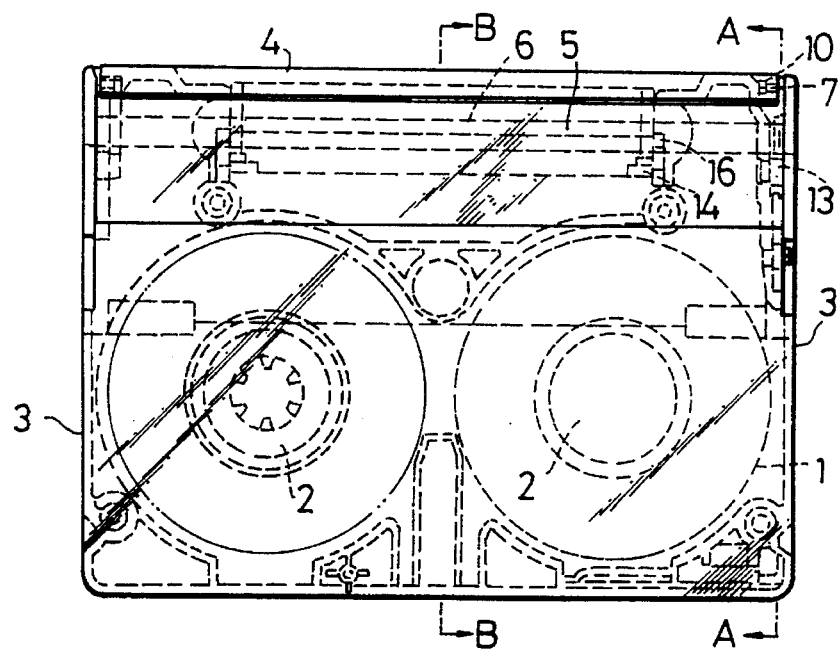
FIG. 1(c) is a plan view of the tape cassette shown in FIG. 1(a)

Now, a tape cassette according to the present invention will be described hereinafter with reference to the accompanying drawings.

Referring first to FIGS. 1(a) to 9, an embodiment of a tape cassette of the present invention is illustrated, wherein reference numeral 1 designates a tape wound on a pair of reel hubs 2 rotatably arranged in a casing 3. The casing 3 is formed at both sides of a front portion thereof with openings through which an interior of the casing is permitted to communicate with an exterior thereof. The casing 3 is also formed at a portion thereof between both openings with a recess. The tape 1 is arranged in a manner to extend from one of the reel hubs 2 through one of the openings to the front portion of the casing and then extend through the other opening to the other reel hub 2 while being kept stretched between both reel hubs. The tape cassette also includes a lid arranged so as to cover a portion of the tape 1 positioned at the front portion of the casing 1 while being kept stretched. More particularly, the lid includes a front lid member 4 for covering a front surface of the portion of the tape, an upper lid member 5 for covering its upper end or surface and a rear lid member 6 for covering its rear surface. The upper lid member 5 is pivotally supported through at least one support shaft 7 on the front lid member 4. The support shaft 7 includes a diameter increased or enlarged section 9 formed on a part of an outer periphery thereof with a cutout 8. Correspondingly, the front lid member 4 is formed with at least one shaft bearing hole 10 in which the diameter enlarged section 9 is rotatably fitted. The shaft bearing hole 10 is formed with an opening 11 on a side thereof on which the upper lid 5 is inserted into or connected to the front lid 4. The opening 11 is formed with a dimension smaller than a diameter d of a portion of the diameter enlarged section 9 which is not formed with the cutout 8 and substantially equal to or more than a diameter $d_1$ of a portion thereof which is formed with the cutout 8.

Such arrangement of the support shaft 7 including the diameter enlarged section 9 and the shaft bearing hole 10 at the front lid 4 and upper lid 5 may be likewise applied to a combination of the upper lid member and rear lid member, that of the front lid member and rear lid member and that of any one of the lid members and the casing.

Figure 6A:
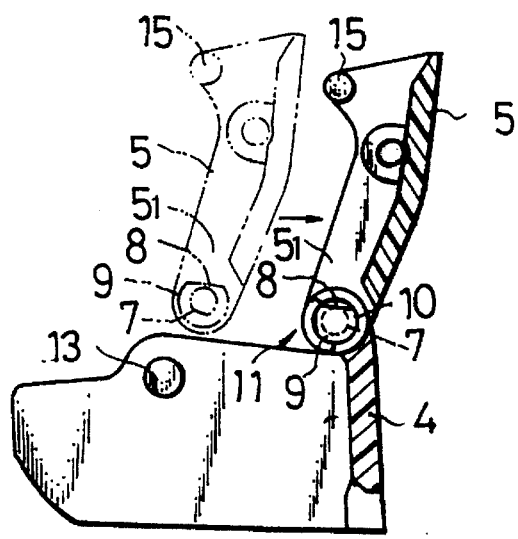
Figure 6B:
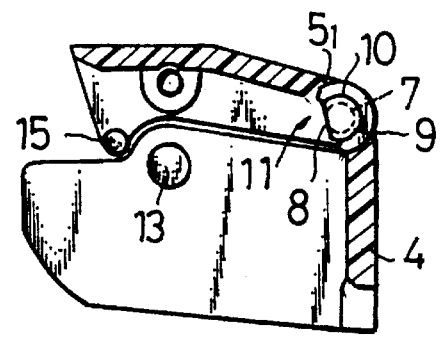
Figure 7:
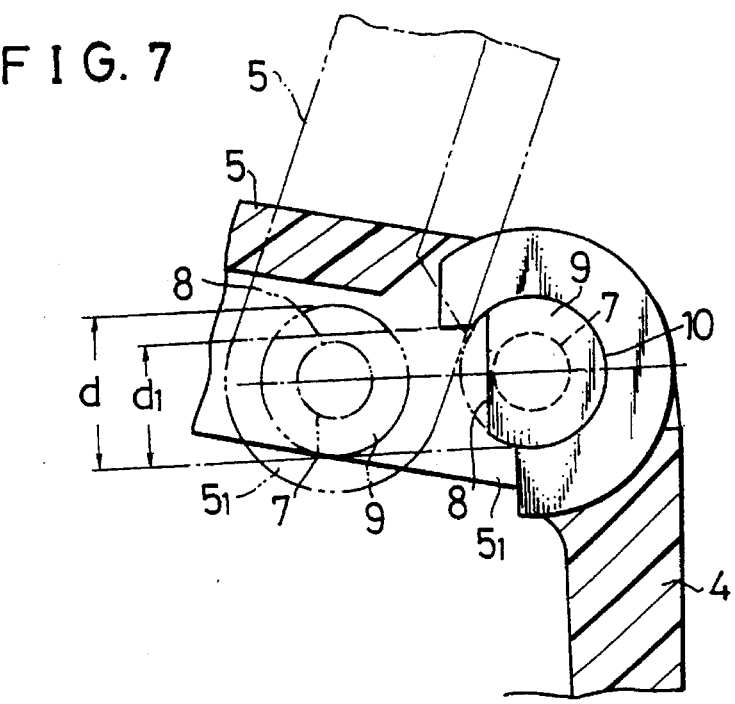
FIG. 7 is a fragmentary sectional view showing assembling of an essential part of the lid shown in FIGS. 6(a) and 6(b)
Figure 8:
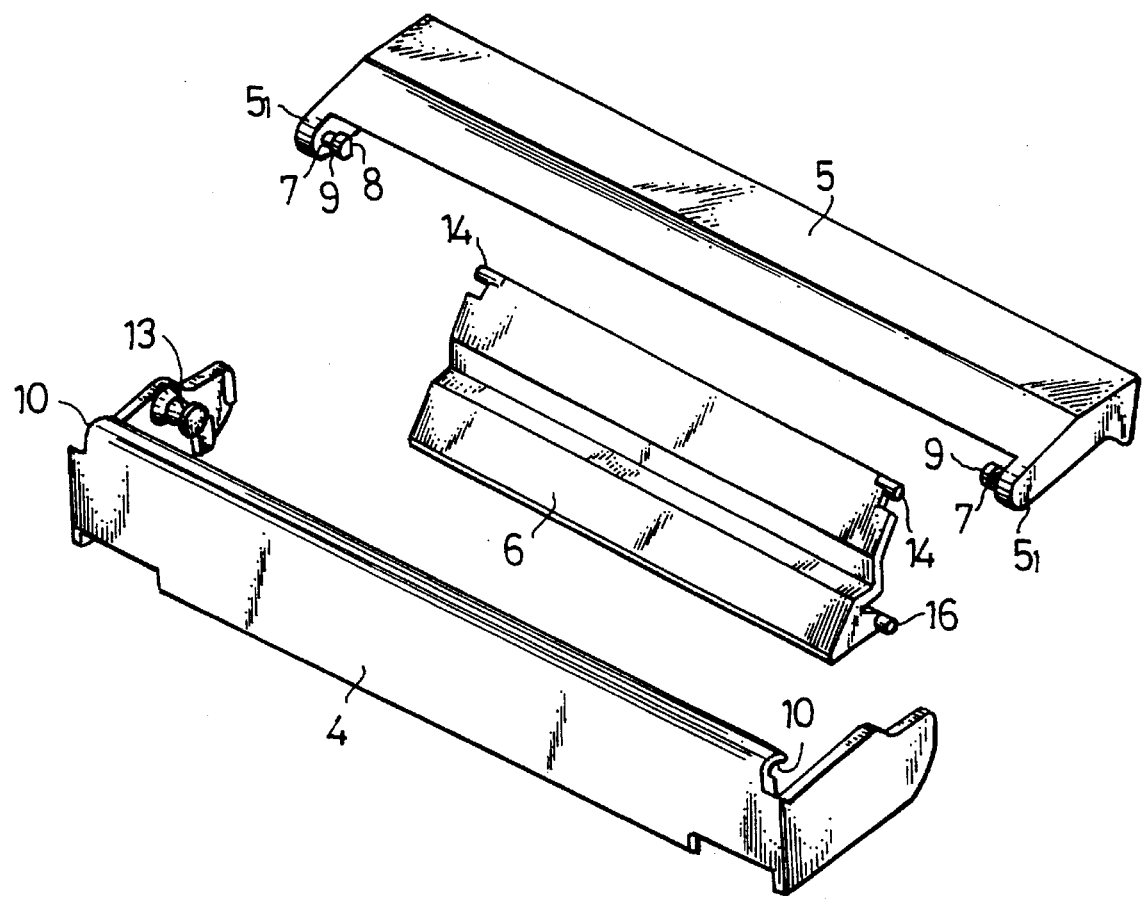
FIG. 8 is an exploded perspective view of the lid shown in FIGS. 6(a) and 6(b)
Figure 9:
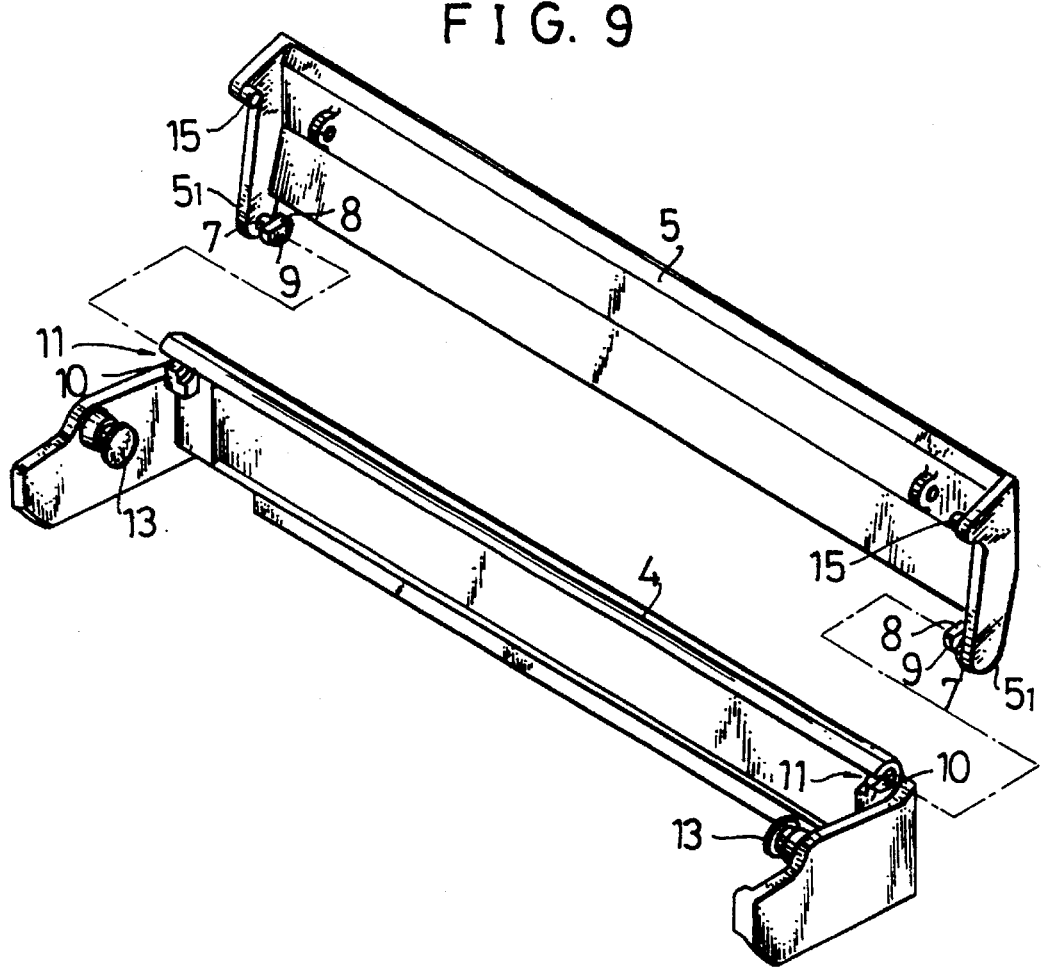
FIG. 9 is an exploded perspective view showing a front lid member and an upper lid member in the lid shown in FIGS. 6(a) and 6(b)

The cutout 8 of the diameter enlarged section 9 of the support shaft 7 may be formed by removing a part of an outer periphery thereof by cutting. The shaft bearing hole 10 in which the diameter enlarged section 9 of the support shaft 7 is fitted is formed on a side thereof on which the diameter enlarged section 9 is inserted into the shaft bearing hole 10 with the opening 11 of a width smaller than a diameter of the diameter enlarged section 9. The opening 11 may be formed by cutting. Thus, it is required to carry out insertion of the diameter enlarged section 9 into the shaft bearing hole 10 while orientating the diameter enlarged section 9 at a predetermined angle with respect to the opening 11 and therefore the shaft bearing hole 10. More particularly, the insertion requires to orientate the diameter enlarged section 9 in a direction perpendicular to a cut-out surface of the cutout 8. Also, it is required that such orientation of the diameter enlarged section 9 is out of a range within which the lid is pivotally moved for opening the casing 3 after assembling of the tape cassette, to thereby prevent the support shaft from being released or disengaged from the shaft bearing hole 10. For example, as shown in FIG. 6(a), the insertion may be carried out in such a manner that the upper lid member 5 is inserted along an upper surface of front lid member 4 into the front lid member 4 while being kept erected, to thereby fit the diameter enlarged section 9 of the support shaft 7 in the shaft bearing hole 10 and then pivotally moved by an angle of about 90 degrees, to thereby be rendered horizontal. After the lid is thus assembled, the upper lid member 5 is moved in only a horizontal direction when the lid is actuated by associated movement of the lid members. Thus, after assembling of the tape cassette, the diameter enlarged section 9 is effectively prevented from being released or disengaged from the opening 11 of the shaft bearing hole 10, to thereby be positively held in the shaft bearing hole 10.

In the illustrated embodiment, two such support shafts 7 are arranged on arms $5_1$ projectedly provided on both sides of the upper lid member 5 in a manner to inwardly extend therefrom and be opposite to each other. The support shafts 7 each are provided with the diameter enlarged section 9, which is formed with the cutout 8 of which the cut-out surface extends in a direction perpendicular to a horizontal top surface of the upper lid member 5. In correspondence to the support shafts 7, two such shaft bearing holes 10 are arranged on both sides of an upper edge of the front lid member 4. The shaft bearing holes 10 each are formed in the shape of recess both sides of bent wall section formed by inwardly bending the upper edge of the front lid member 4.

Figure 2:
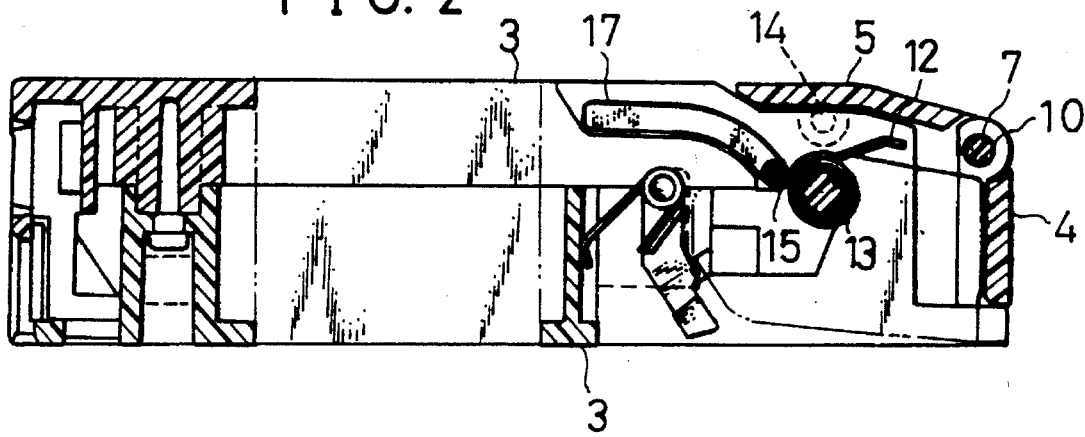
FIG. 2 is a vertical sectional view taken along line A—A of FIG. 1(c)
Figure 3:
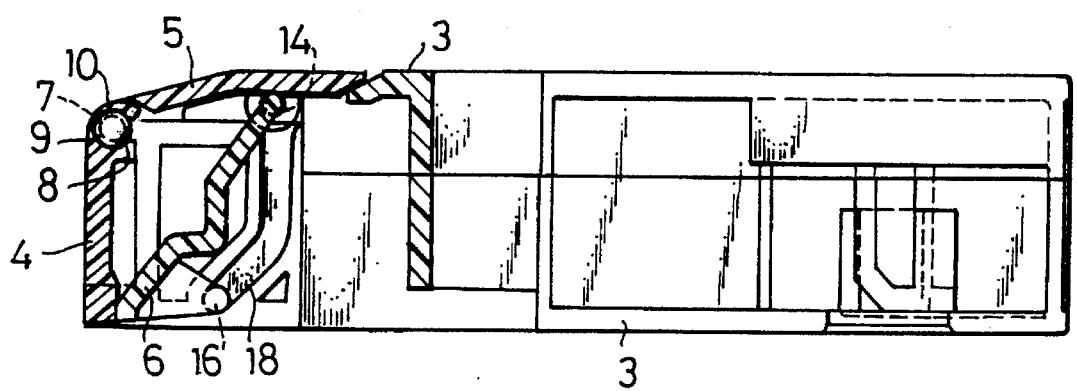
FIG. 3 is a vertical sectional view taken along line B—B of FIG. 1(c)
Figure 4:
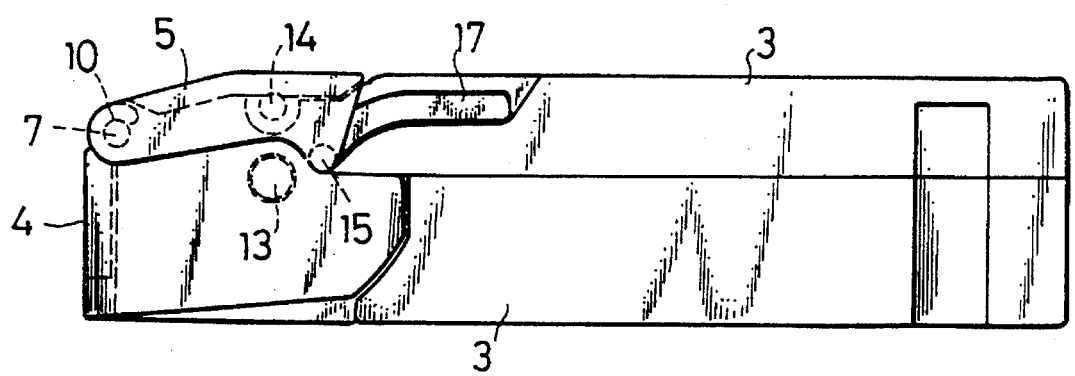
FIG. 4 is a side elevation view of the tape cassette shown in FIGS. 1(a) to 1(c)
Figure 5A:
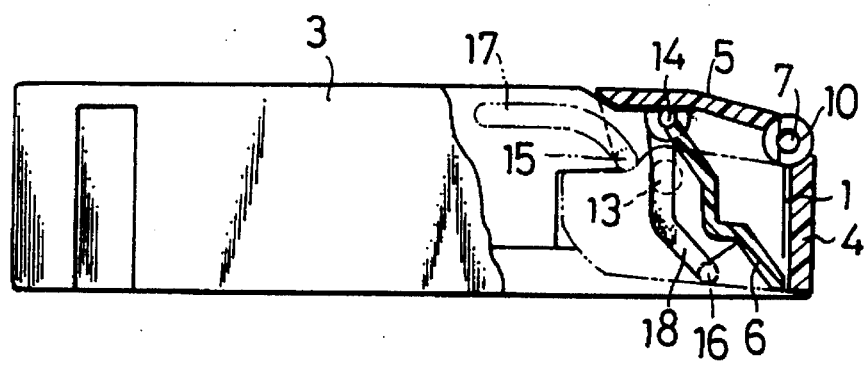
Figure 5B:
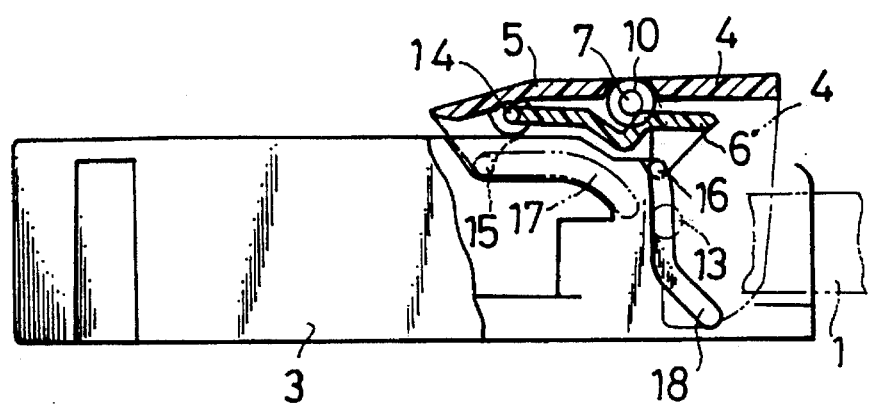

Also, in the illustrated embodiment, the front lid member 4 is provided on both sides thereof with side plates, on which the upper lid member 5 provided with the arms $5_1$ is supported. The side plates of the front lid member 4 are provided on an inner surface thereof with pivot pins 13 in a manner to be opposite to each other, through which the front lid member 4 is pivotally mounted or supported on the casing 3. Also, the front lid member 4 is forced in a closed direction by a spring 12 (FIG. 2). Further, the upper lid member 5 is pivotally connected to the rear lid member 6 through pivot pins 14 provided on the rear lid member 6. The upper lid member 5 and rear lid member 6 are provided thereon with guide pins 15 and 16, respectively, as shown in FIGS. 5(a) and 5(b). The guide pins 15 and 16 are engagedly fitted in guide grooves 17 and 18 formed on the casing 3, so that the front lid member 4, upper lid member 5 and rear lid member 6 are operated in association with each other with respect to the casing 3, as shown in FIGS. 5(a) and 5(b).

As described above, the illustrated embodiment is so constructed that the support shaft 7 of the lid is provided with the diameter enlarged section 9 formed with the cutout 8 and the shaft bearing hole 10 for fitting the diameter enlarged section 9 therein is provided with the opening 11 smaller than the diameter enlarged section 9. Such construction requires to orientate the diameter enlarged section 9 at a predetermined angle with respect to the opening 11 and therefore the shaft bearing hole 10 in order to insert the diameter enlarged section 9 of the support shaft 7 into the shaft bearing hole 10 for assembling of the lid. Such orientation of the diameter enlarged section 9 is out of a range within which the lid is pivotally moved for selectively opening the casing 3 after assembling of the tape cassette of the illustrated embodiment, so that the diameter enlarged section 9 is effectively prevented from being disengaged from the shaft bearing hole 10 during operation of the tape cassette. Thus, the illustrated embodiment significantly facilitates insertion of the support shaft into the shaft bearing hole while preventing deforming the lid members and effectively prevents releasing or disengagement of the support shaft from the shaft bearing hole due to application of shock to the tape cassette or the like once the assembling of the tape cassette is completed.

Figure 10:
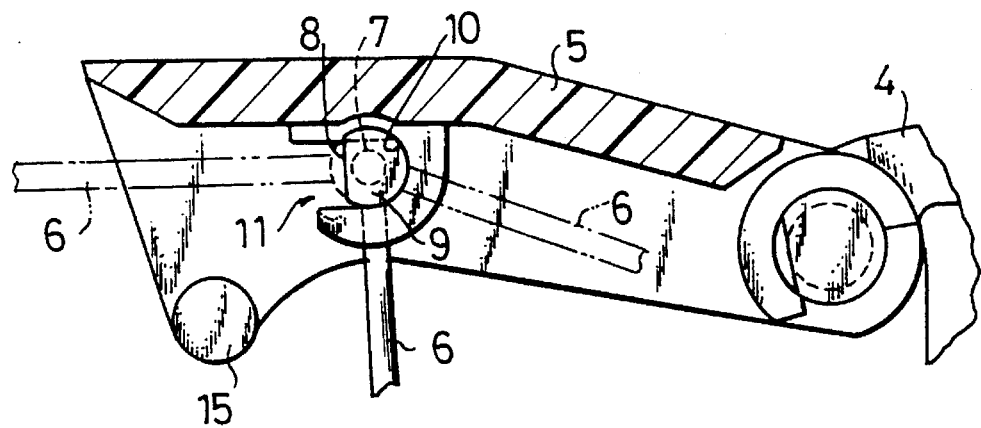
FIG. 10 is an enlarged sectional side elevation view showing an essential part of another embodiment of a tape cassette according to the present invention.

Referring now to FIG. 10, another embodiment of a tape cassette according to the present invention is illustrated. The illustrated embodiment is constructed in such a manner that an upper lid member 5 is formed with two shaft bearing holes 10 each formed with an opening 11 and a rear lid member 6 is provided with support shafts 7 each including a diameter enlarged section 9 formed with a cutout 8 through which the diameter enlarged section 9 is fitted in the shaft bearing hole 10, resulting in the diameter enlarged section being pivotally moved within an actuation range of the rear lid member. The remaining part of the illustrated embodiment may be constructed in substantially the same manner as the above-described embodiment.

Referring now to FIG. 11, a further embodiment of a tape cassette according to the present invention is illustrated. The embodiment of FIG. 11 is so constructed that for the purpose of connection between a front lid member 4 and a casing 3, the casing 3 is formed with shaft bearing holes 10 each including an opening 11 and the front lid member 4 is provided with support shafts 7 each including a diameter enlarged section 9 formed thereon with a cutout 8, through which the diameter enlarged section 9 is inserted into the shaft bearing hole 10, resulting in being pivotally moved within an actuation range of the front lid member 4. The remaining part of the illustrated embodiment may be constructed in substantially the same manner as the above-described embodiments.

In each of the embodiments described above, the diameter enlarged section 9 of the support shaft 7 and the shaft bearing hole 10 are arranged in correspondence to each other. Thus, a combination of the support shaft and shaft bearing hole may be selectively provided on the lid members 4 to 6 and casing 3 as desired. Also, at least one such combination may be applied to a connection among the lid members and casing.

As can be seen from the foregoing, the tape cassette of the present invention is so constructed that the lid including the front lid member for covering the front surface of the tape, the upper lid member for covering its upper surface and the rear lid member for covering its rear surface is arranged so as to be openable with respect to the casing, to thereby selectively expose the tape, wherein the connection between each two of the lid members is constituted by the diameter enlarged section of the support shaft of one of the lid members provided with the cutout and the shaft bearing hole of the other lid member formed with the opening smaller than the diameter enlarged section and substantially equal to or smaller than the cutout. Such construction permits assembling of the lid including the three lid members to be carried out through the connection without deforming the lid members and facilitates assembling of the lid while increasing a space required for pivotal movement of the lid. Also, the construction not only effectively prevents disassembling of the lid due to application of shock or the like thereto once it is assembled and ensures smooth and safe operation of the lid, but permits the structure of the tape cassette to be significantly simplified to improve productivity of the tape cassette.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette comprising:

a casing;

a pair of reel hubs rotatably arranged in said casing and having a tape wound thereon in a manner to be stretched therebetween while extending from one of said reel hubs through a front portion of said casing to the other of said reel hubs;

a lid including a front lid member for covering a front surface of said tape, an upper lid member for covering an upper end of said tape and a rear lid member for covering a rear surface of said tape;

said lid being arranged on said casing so as to selectively expose said tape when the tape cassette is charged in a recording and reproducing equipment;

each of said front lid member, upper lid member and rear lid member being connected to at least two of said casing and the remaining lid members through connections so that said front, upper and rear lid members are operatively associated with each other when said lid is operated; and at least one of said connections being constituted by at least one support shaft provided on one of said lid members and casing and at least one bearing section provided on another one of said lid members and casing so as to pivotally support said support shaft;

said support shaft being provided with a diameter enlarged section formed on a part of an outer periphery thereof with a cutout;

said bearing section being formed with a bearing hole in which said diameter enlarged section of said support shaft is rotatably fitted and which is formed with an opening through which said support shaft is inserted into said bearing hole;

said opening of said bearing hole being formed in a manner to be parallel to an axis of said bearing hole and with a size smaller than a diameter of said diameter enlarged section and equal to or larger than a diameter of said part of said diameter enlarged section at which said cutout is formed.

2. A tape cassette as defined in claim 1, wherein said one of said lid members and casing on which said support shaft is provided is said upper lid member and said another one of said lid members and casing at which said bearing section is provided is said front lid member;

said upper lid member being pivotally supported on said front lid member.

3. A tape cassette as defined in claim 2, wherein said front lid member is bent at an upper edge thereof to form a bent wall section;

said bearing hole comprising a recess formed at each of both sides of said bent wall section.

4. A tape cassette as defined in claim 3, wherein said upper lid member is provided on an inside thereof with at least one second bearing section and said rear lid member is provided with at least one second support shaft;

said rear lid member is pivotally supported through said second support shaft at said second bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

5. A tape cassette as defined in claim 4, wherein said second support shaft of said rear lid member is provided with a second diameter enlarged section formed on a part of an outer periphery thereof with a second cutout; and said second bearing section of said upper lid member is formed with a second bearing hole in which said second diameter enlarged section of said second support shaft is rotatably fitted and which is formed with a second opening through which said second support shaft is inserted into said second bearing hole;

said second opening of said second bearing hole being formed in a manner to be parallel to an axis of said second bearing hole and with a size smaller than a diameter of said second diameter enlarged section and equal to or larger than a diameter of said part of said second diameter enlarged section at which said second cutout is provided.

6. A tape cassette as defined in claim 5, wherein said casing is provided with at least one third bearing section and said front lid member is provided with at least one third support shaft;

said front lid member is pivotally supported through said third support shaft at said third bearing section;

said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout is provided.

7. A tape cassette as defined in claim 4, wherein said casing is provided with at least one third bearing section and said front lid member is provided with at least one third support shaft; and said front lid member is pivotally supported through said third support shaft at said third bearing section.

8. A tape cassette as defined in claim 7, wherein said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout s provided.

9. A tape cassette as defined in claim 4, wherein a cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

10. A tape cassette as defined in claim 3, wherein said casing is provided with at least one third bearing section and said front lid member is provided with at least one third support shaft;

said front lid member is pivotally supported through said third support shaft at said third bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

11. A tape cassette as defined in claim 2, wherein said upper lid member is provided on both sides thereof with arms in a manner to be projected therefrom;

said arms each being provided on an inside thereof with said support shaft so that the support shafts of said arms are opposite to each other;

said support shafts each being provided at an end thereof with said diameter enlarged section;

said cutout of said enlarged section having a cut-out surface formed in a manner to be perpendicular to a horizontal top surface of said upper lid member.

12. A tape cassette as defined in claim 11, wherein said front lid member is bent at an upper edge thereof to form a bent wall section;

said bearing hole comprising a recess formed at each of both sides of said bent wall section.

13. A tape cassette as defined in claim 12, wherein said upper lid member is provided on an inside thereof with at least one second bearing section and said rear lid member is provided with at least one second support shaft;

said rear lid member is pivotally supported through said second support shaft at said second bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

14. A tape cassette as defined in claim 13, wherein said casing is provided with at least one third bearing section and said front lid member is provided with at least one third support shaft; and said front lid member is pivotally supported through said third support shaft at said third bearing section.

15. A tape cassette as defined in claim 14, wherein said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout is provided.

16. A tape cassette as defined in claim 5, wherein said second support shaft of said rear lid member is provided with a second diameter enlarged section formed on a part of an outer periphery thereof with a second cutout; and said second bearing section of said upper lid member is formed with a second bearing hole in which said second diameter enlarged section of said second support shaft is rotatably fitted and which is formed with a second opening through which said second support shaft is inserted into said second bearing hole;

said second opening of said second bearing hole being formed in a manner to be parallel to an axis of said second bearing hole and with a size smaller than a diameter of said second diameter enlarged section and equal to or larger than a diameter of said part of said second diameter enlarged section at which said second cutout is provided.

17. A tape cassette as defined in claim 16, wherein said casing is provided with at least one third bearing section and said front lid member is provided with at least one third support shaft;

said front lid member is pivotally supported through said third support shaft at said third, bearing section;

said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout is provided.

18. A tape cassette as defined in claim 13, wherein said cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

19. A tape cassette as defined in claim 12, wherein said casing is provided with at least one third bearing section and said front lid member is provided with at least one third support shaft;

said front lid member is pivotally supported through said third support shaft at said third bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves respectively.

20. A tape cassette as defined in claim 11, wherein said upper lid member is provided on an inside thereof with at least one second bearing section and said rear lid member is provided with at least one second support shaft;

said rear lid member is pivotally supported through said second support shaft at said second bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

21. A tape cassette as defined in claim 20, wherein said second support shaft of said rear lid member is provided with a second diameter enlarged section formed on a part of an outer periphery thereof with a second cutout; and said second bearing section of said upper lid member is formed with a second bearing hole in which said second diameter enlarged section of said second support shaft is rotatably fitted and which is formed with a second opening through which said second support shaft is inserted into said second bearing hole;

said second opening of said second bearing hole being formed in a manner to be parallel to an axis of said second bearing hole and with a size smaller than a diameter of said second diameter enlarged section and equal to or larger than a diameter of said part of said second diameter enlarged section at which said second cutout is provided.

22. A tape cassette as defined in claim 21, wherein said casing is provided with at least one third bearing section and said front lid member is provided with at least one third support shaft;

said front lid member is pivotally supported through said third support shaft at said third bearing section;

said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout is provided.

23. A tape cassette as defined in claim 20, wherein said casing is provided with at least one third bearing section and said front lid member is provided with at least one third support shaft; and said front lid member is pivotally supported through said third support shaft at said third bearing section.

24. A tape cassette as defined in claim 23, wherein said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout s provided.

25. A tape cassette as defined in claim 20, wherein said cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

26. A tape cassette as defined in claim 11, wherein said casing is provided with at least one third bearing section and said front lid member is provided with at least one third support shaft;

said front lid member is pivotally supported through said third support shaft at said third bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

27. A tape cassette as defined in claim 11, wherein said cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

28. A tape cassette as defined in claim 2, wherein said upper lid member is provided on an inside thereof with at least one second bearing section and said rear lid member is provided with at least one second support shaft;

said rear lid member is pivotally supported through said second support shaft at said second bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

29. A tape cassette as defined in claim 28, wherein said second support shaft of said rear lid member is provided with a second diameter enlarged section formed on a part of an outer periphery thereof with a second cutout; and said second bearing section of said upper lid member is formed with a second bearing hole in which said second diameter enlarged section of said second support shaft is rotatably fitted and which is formed with a second opening through which said second support shaft is inserted into said second bearing hole;

said second opening of said second bearing hole being formed in a manner to be parallel to an axis of said second bearing hole and with a size smaller than a diameter of said second diameter enlarged section and equal to or larger than a diameter of said part of said second diameter enlarged section at which said second cutout is provided.

30. A tape cassette as defined in claim 29, wherein said casing is provided with at least one third bearing section and said front lid member is provided with at least one third support shaft;

said front lid member is pivotally supported through said third support shaft at said third bearing section;

said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout is provided.

31. A tape cassette as defined in claim 28, wherein said casing is provided with at least one third bearing section and said front lid member is provided with at least one third support shaft; and said front lid member is pivotally supported through said third support shaft at said third bearing section.

32. A tape cassette as defined in claim 31, wherein said third support shaft of said front lid member is provided with a third diameter enlarged section formed on a part of an outer periphery thereof with a third cutout; and said third bearing section of said casing is formed with a third bearing hole in which said third diameter enlarged section of said third support shaft is rotatably fitted and which is formed with a third opening through which said third support shaft is inserted into said third bearing hole;

said third opening of said third bearing hole being formed in a manner to be parallel to an axis of said third bearing hole and with a size smaller than a diameter of said third diameter enlarged section and equal to or larger than a diameter of said part of said third diameter enlarged section at which said third cutout s provided.

33. A tape cassette as defined in claim 28, wherein a cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

34. A tape cassette as defined in claim 2, wherein said casing is provided with at least one third bearing section and said front lid member is provided with at least one third support shaft;

said front lid member is pivotally supported through said third support shaft at said third bearing section;

said rear lid member is provided on each of both sides thereof with a first guide pin and said upper lid member is provided on each of both sides thereof with a second guide pin; and said casing is formed with first and second guide grooves;

said first and second guide pins being slidably fitted in said first and second guide grooves, respectively.

35. A tape cassette as defined in claim 2, wherein a cut-out surface of said cutout of said diameter enlarged section of said support shaft is located at a position remote from an edge of said opening of said bearing section defined in an axial direction thereof in an assembled state of the lid;

said support shaft being kept engaged with said bearing hole during operation of said lid.

36. A tape cassette as defined in claim 1, wherein said one of said lid members and casing on which said support shaft is provided is said rear lid member and said another one of said lid members and casing at which said bearing section is provided is said upper lid member;

said rear lid member being pivotally supported on said upper lid member.

37. A tape cassette as defined in claim 1, wherein said one of said lid members and casing on which said support shaft is provided is said front lid member and said another one of said lid members and casing at which said bearing section is provided is said casing;

said upper lid member being pivotally supported on said casing.

* * * * *